US012618694B2

(12) United States Patent
Grisot

(10) Patent No.: US 12,618,694 B2
(45) Date of Patent: May 5, 2026

(54) PROXIMITY SENSOR AND ANTENNA

(71) Applicant: Semtech Corporation, Camarillo, CA (US)

(72) Inventor: Sébastien Grisot, Boudry (CH)

(73) Assignee: Semtech Corporation, Camarillo, CA (US)

( * ) Notice: Subject to any disclaimer, the term of this patent is extended or adjusted under 35 U.S.C. 154(b) by 49 days.

(21) Appl. No.: 18/206,916

(22) Filed: Jun. 7, 2023

(65) Prior Publication Data

US 2023/0408300 A1     Dec. 21, 2023

(30) Foreign Application Priority Data

Jun. 17, 2022     (CN) .......................... 202210686233.6

(51) Int. Cl.
*G01D 5/24*          (2006.01)
*G01B 7/14*          (2006.01)

(52) U.S. Cl.
CPC ............. *G01D 5/2405* (2013.01); *G01B 7/14* (2013.01)

(58) Field of Classification Search
CPC ...... G01D 5/2405; G01D 5/2417; G01B 7/14; H03K 2217/960765
See application file for complete search history.

(56) References Cited

U.S. PATENT DOCUMENTS

| | | |
|---|---|---|
| 10,545,614 B2 | 1/2020 | Maharyta et al. |
| 11,598,681 B2 | 3/2023 | Sun et al. |

| | | | | |
|---|---|---|---|---|
| 2010/0259283 A1* | 10/2010 | Togura | ................. | H03K 17/955 |
| | | | | 324/679 |
| 2012/0280698 A1* | 11/2012 | Oya | ...................... | G06F 3/0443 |
| | | | | 324/658 |
| 2016/0150350 A1* | 5/2016 | Ingale | ..................... | H04W 4/38 |
| | | | | 370/255 |
| 2017/0254633 A1* | 9/2017 | Tanahashi | ............ | H03K 17/955 |
| 2018/0254909 A1* | 9/2018 | Hancock | .............. | H04L 9/3268 |
| 2018/0358965 A1* | 12/2018 | Rouaissia | ............ | H03K 17/955 |
| 2019/0226879 A1 | 7/2019 | Lakatos et al. | | |
| 2022/0352890 A1* | 11/2022 | Stahl | .................... | H03K 17/962 |

FOREIGN PATENT DOCUMENTS

| | | | |
|---|---|---|---|
| EP | 2876407 B1 | | 5/2018 |
| EP | 3416031 A1 | | 12/2018 |
| JP | 2010223794 A | * | 10/2010 |
| JP | 2013015976 A | | 1/2013 |
| JP | 2021512329 A | | 5/2021 |
| WO | WO2021/037828 A1 | | 3/2021 |

OTHER PUBLICATIONS

Office Action issued in related Korean Application No. 10-2023-0075964, mailed Mar. 18, 2025, 5 pages.

* cited by examiner

*Primary Examiner* — Dominic E Hawkins
(74) *Attorney, Agent, or Firm* — BLANK ROME LLP

(57) ABSTRACT

A capacitive proximity sensor with a stacked electrode structure where an inner electrode is partially screened by an upper one. The self-capacitances of selected electrodes is measured while other electrodes are held to ground or to a shield potential. In this manner, the proximity sensor estimates a value of the dielectric permittivity of the approaching body.

9 Claims, 2 Drawing Sheets

PROXIMITY SENSOR AND ANTENNA

REFERENCE DATA

The present application claims priority from China patent application 202210686233-6 of Jun. 17, 2022, the content whereof are hereby incorporated in their entirety.

TECHNICAL DOMAIN

The present disclosure concerns a proximity sensor for detecting closeness to a body part of a user, rejecting the unwanted influence of water drops or other similar contaminations. Embodiments of this invention concern connected portable devices like cell phones tablets or laptops that, being equipped with the proximity sensor of the invention, can detect reliably when a user is close. A special but not exclusive embodiment is a portable connected device whose power of radio emission is adapted in consideration of the user's proximity, to limit the exposition to RF energy. Another special application of the present invention is in wearable devices, such as smart watches, sport watches, earplugs and so on, where the proximity sensor is advantageously used as input device.

RELATED ART

In many applications it is important to detect whether a body portion is at short distance of an apparatus. In the special case of connected portable devices such as cell phones tablets and laptops, this information is instrumental in several important functions like, limiting the absorbed dose of RF energy, or limiting the power consumption by shutting down the display when the phone is brought to the ear, or activating special functions.

Another important function of proximity sensors is, in a portable phone, disabling the tactile screen when the user brings the phone to the ear. Without this, the user could inadvertently cut a call or trigger unwanted actions by touching the screen with his/her cheek or fingers.

There is an ever-increasing need for miniaturizing proximity sensors in wearable devices such as smart watches, sport watches and wireless earphones and so on. Space in wearables is very limited and conventional switch buttons are undesirable. Proximity sensors are used as described above as well as input devices, for example for increasing or decreasing the reproduction volume, rejecting or accepting a call, start a Bluetooth® pairing or any other useful function. The device of the invention can be used as genuine proximity sensor in wearables too, for example to detect whether an earplug is inserted in the ear of a user or not.

Avoiding false detections is as important as the ability to sense proximity. Many proximity sensors used in portable phone exploit the changes in the capacity of an electrode in response to the approach of a body part. This technique is appealing because the sensor is a simple conductive electrode, easy to integrate on a printed circuit board. It can give rise to false detections, however, because conventional capacitive systems are incapable of discriminating between a large object at a certain distance, and a small one at closer distance. They are also unable to distinguish between the approach of a part of a human body such as a hand or the head of a user and an inanimate object, like a tabletop.

Other proximity detection techniques are available, for example based on optical detection. Drawbacks of these systems are however the power consumption, the cost of the needed components and of their integration in the mobile device and the inability to discriminate between different objects.

European patent EP2876407 B1, in the name of the applicant describes capacitive sensors that are read by means of charge amplifiers connected to a floating variable voltage reference. The same document describes the use of such sensors in touch-sensitive displays.

Capacitive proximity sensors determine the presence of both conductive and dielectric bodies in the detection region. The effect of a dielectric body on the measured capacitances will change according to his size, distance from the sensor and to the polarizability of the material, the latter being measured by the material's relative dielectric permittivity $\varepsilon_r$ (also simply called the permittivity or dielectric constant of the material). For the purposes of this disclosure, conductive bodies can be regarded as dielectric bodies with a very high permittivity. In the art, proximity sensor decide that a body is approaching when the measured capacitance exceeds some given threshold. This however can happen at different distances according to size and permittivity of the approaching body, and conventional sensors cannot discriminate between these factors.

SHORT DISCLOSURE

The present disclosure proposes a proximity detector with the ability to discriminate between objects of different permittivity. In this way, approaching bodies of different nature can trigger different actions, and the proximity threshold can be corrected to be less dependent from the permittivity.

According to the invention, these aims are attained by the object of the attached claims, and especially by a capacitive proximity sensor for detecting the presence of a conductive or dielectric body in a detection region adjacent to a portable device, the sensor comprising a stacked structure having on a first layer a first electrode facing the detection region and, on a second layer an internal electrode, wherein the first electrode has a plurality of openings that allow a partial capacitive coupling between the internal electrode and conductive and/or dielectric bodies in the detection region, such that the first electrode screens partially the internal electrode, the capacitive proximity sensor comprising one or more than one capacitance reading units configured to determine a capacitance of one electrode and a shield control unit configured to generate a shield potential following that of an electrode whose capacitance is measured by a capacitance reading unit, the capacitive proximity sensor comprising a readout circuit configured to determine a first capacitance of either the first electrode or the internal electrode by applying the shield potential to the other electrode and a second capacitance of either the first electrode or the internal electrode while keeping the other electrode at a fixed potential, and to determine a permittivity of a body in the detection region based on said first capacitance and second capacitance.

The fixed potential used when measuring the second capacitance may be the ground potential, but in fact the absolute value of this potential is not relevant.

Dependent claims relate to important and useful features of the invention that are not however essential, like the determination of the distance to the body in the detection region based on said first capacitance and second capacitance, or a digital interface to transmit the distance or the permittivity or a binary proximity value to a host system.

The data are transmitted as multibit binary variables on a suitable bus, preferably a serial bus like I2C to reduce the number of interconnections.

The sensor of the invention may also have an interrupt request terminal by which it can request the attention of the host system (a microcontroller) once a proximity has been detected.

The capacitive proximity sensor of claim 1, wherein the openings are arranged in a regular lattice of holes or stripes.

While the electrodes of the inventive sensor may be obtained in many ways, an especially convenient realization is when they are etched out of the copper of a multilayer printed circuit. The same circuit may also include the electronic elements of the sensor, in an integrated circuit.

With respect to what is known in the art, the invention provides the advantage that it can be easily integrated in electronic portable devices and provides a rich information in a small package. The electrodes are readily obtainable with standard PCD fabrication techniques and do not take up much space. The determination of the permittivity and, optionally of the distance is useful to discriminate against false approaches. The unit can be used also to realize very sensitive input devices that react to the touch of a finger without moving parts, and are not triggered easily by false events, contamination or water.

Importantly, the proximity detector operates at low frequency and is rather insensitive to radiofrequency signals. It is then possible to couple capacitively one or all the with a radio circuit and let them take double duty as antennas. The radio circuit may be a transmitter and/or a receiver or, most preferably, a digital bidirectional radio interface, such as a Bluetooth® interface, a WiFi interface, a cellphone interface. The electrode can assume the structure of a planar antenna without changing its effectiveness as proximity sensor. Decoupling inductors can be used to block the radiofrequency signal at the inputs of the proximity sensor.

As it will be clearer in the following disclosure, the inventive proximity detector uses the different configurations of the electric field that arise when the first electrode and the inner electrode are at the same potential or, conversely, one of them is held to a fixed potential. In the former case, the electric field approaches that of a simple flat electrode and extends away from the detector. In the latter, the electric field is stronger in the space between the electrodes and decays quickly when moving away from the detector. It will be shown that the present invention uses this difference to estimate the permittivity, or also the distance, of the approaching body and transmit an estimate of this quantity to a host system, encoded in a digital variable, by a suitable data bus.

SHORT DESCRIPTION OF THE DRAWINGS

Exemplar embodiments of the invention are disclosed in the description and illustrated by the drawings in which.

EXAMPLES OF EMBODIMENTS OF THE PRESENT INVENTION

Figure 1:
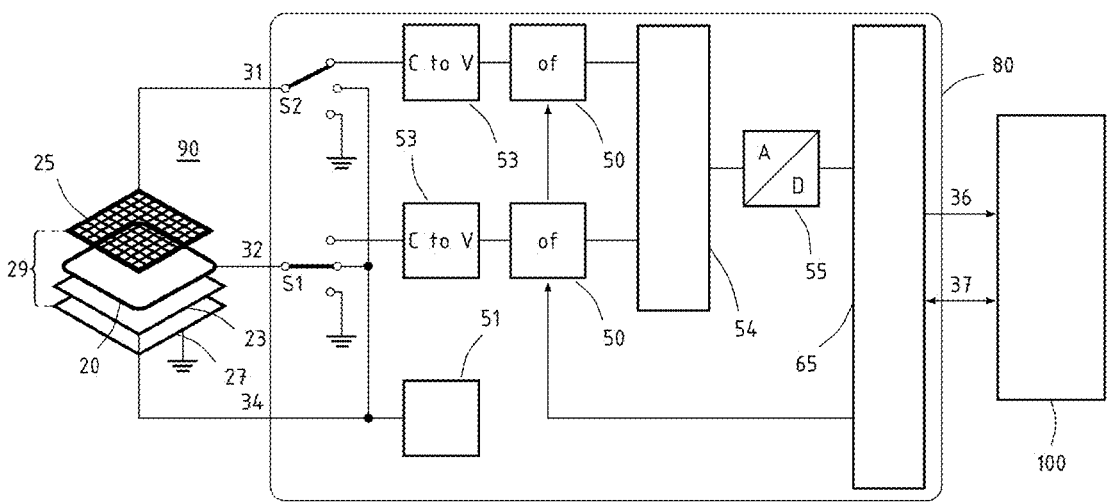
FIG. 1 illustrates schematically a detector according to the invention, in a very simplified conceptual representation, and a host system—a digital processor—connected thereto.

FIG. 1 represents a simplified circuit of a capacity proximity sensor that can be used in the frame of the invention. The sensor comprises an electronic circuit 80, preferably an integrated circuit, that reads the capacitance of at least two electrodes. The example shows two electrodes: a first electrode 25 (also called "an external electrode") connected to a first capacitive input 31 of the integrated circuit, and an inner electrode 20 connected to a second capacitive input 32 of the same. The first electrode is stacked above the inner electrode 25 and screen it partially from the detection region 90, which is above the first electrode. The first electrode 25 has a series of apertures that allow a partial capacitive coupling between the inner electrode 25 and electric charges in the detection region.

The stack 29 of electrodes is optionally completed by an active shield electrode 23 below the inner electrode connected to a shield control terminal of the circuit 80, and preferably also a passive screen 27 below the active shield 23.

The example represented in FIG. 1 is a single-channel sensor. The integrated circuit 80 is configured to read a single stack of electrodes 29. This is not a limitation of the invention, however. The circuit 80 could be configured to read several stacks of electrodes without leaving the scope of the present disclosure.

The first electrode 25 is connected to a first capacitive input of the circuit and to a capacitance measuring circuit 53 that generates a signal related to the self-capacitance of the first electrode 25, for example, a capacitance-to-voltage converter. Several circuits can be used to achieve this. In possible implementations, the capacitance measuring unit impresses a variable voltage on the electrode and determines the corresponding electric charge by a current integrator circuit, whereby the capacitance is given by the ratio between charge and voltage change.

The capacitance of the first electrode 25 is liable to be modified by nearby conductive of dielectric bodies and this change of capacitance is used to detect the proximity of such a body. The proximity-induced change is much smaller than the intrinsic capacitance of the electrode plus that of the connection line linking the electrode to the measuring circuit, however. Preferably, the circuit includes an offset subtraction circuit 50 configurable by the processor 65 to subtract an arbitrary baseline value from the output of the capacitance-measuring circuit. The resulting value is then converted to a suitable digital representation in the A/D converter 55 and transferred to the digital processor 65 for further elaborations.

Advantageously, the input terminals 32 for the inner electrode can be put in a shield mode, in which it is connected to the shield controller unit 51, or in a ground mode in which it is tied to a fixed potential, which may be the ground reference. The shield controller unit 51 generates a shield potential that follows closely that of the capacitive input that is measured at any given moment. In this way, electrodes that are in the shield mode do not contribute to the measured capacitance.

It will be appreciated that the shield potential is often a variable potential following the variable voltage of the active input terminal. The two should be the same at least in the frequency band at which the measurement happens. A constant voltage offset, for example, is irrelevant.

In the represented example both the first input 31 and the second input 32 can be set to measure mode, to shield mode, or to ground, as symbolized by switches S1, S2, and the inner electrode has its own instances of capacitance measuring circuit 53 and offset compensation unit 50, while a multiplexer 54 is used to pass either of the capacitance signals to the ADC 55. This, however, is not strictly required.

The capacitive proximity IC 80 has terminals for communication with a host system 100, which could be a microcontroller. These may include a digital bus 37, for example an I2C bus, for transmitting any desired digital variable, and a proximity binary output 36 to signal the approach of a body in the detection region.

Figure 2:
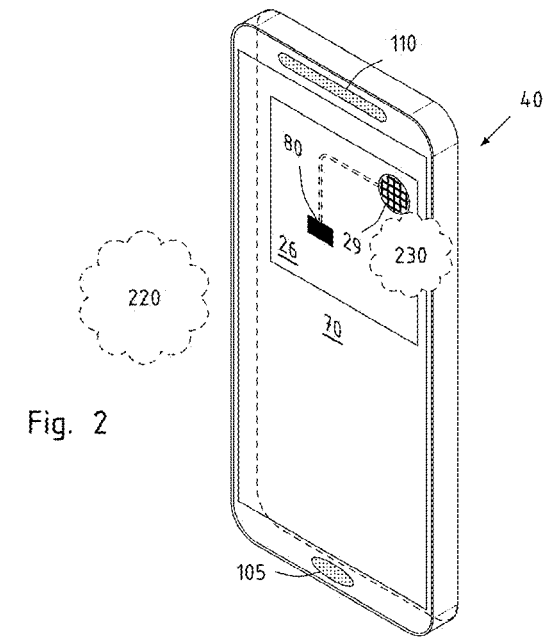
FIG. 2 shows a possible implementation of the invention in a portable phone, the detector being assembled on a printed circuit board. This figure illustrates some dielectric/conductive bodies in the detection region as well.

FIG. 2 is a schematic representation of the capacitive proximity sensor in a portable device 40. The portable device 40 is here embodied as a smartphone with a touch-sensitive display, a loudspeaker 110, a microphone 105, but these are not essential features. The device 40 could be a tablet, a laptop, a wearable device such as a smart watch, a training watch, a Bluetooth® speaker, an earphone, a network device such as a router or a Wi-Fi access point, or indeed any kind of electronic portable device in need of proximity awareness. This disclosure will refer simply to a "smartphone" for concision's sake, it being understood that the this is not a limiting feature of the invention.

The portable device 40 has a printed circuit board 26 on which electronic components are soldered. Among those, the integrated circuit capacitive proximity sensor 80 is soldered on the PCB 26. The electrode stack 29 is fabricated on the PCB and are connected to the integrated circuit 80 by conductive tracks in the PCB and are not necessarily immediately adjacent thereto. This simplifies the layout of the circuit considerably.

Figure 3:
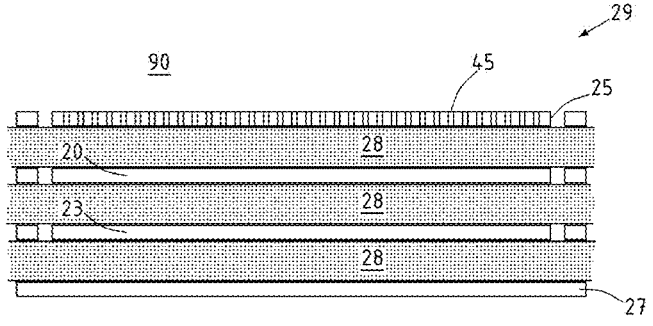
FIG. 3 shows a possible realization of the sense electrodes used by the invention, in a printed circuit board.

FIG. 3 shows the stacked structure 29 in section. The vertical scale in this figure has been stretched for clarity. The first electrode 25 connected to the first capacitive input 31 is a conductive pattern etched in a layer of the PCB and covers completely the layers 20, 23 below. The lowest level of the stack contains the ground plane 27, but it may also comprise tracks at variable voltages, if needed in the layout.

The inner electrode 20 connected to the second capacitive input 32 of the integrated circuit 80 is on a layer below that of the first electrode 25 and may be a solid area of copper. Preferably the inner electrode 20 is completely covered by the first electrode 25. It is not totally screened from the detection region 90 because the first electrode 25 has opening 45 that consent a certain amount of capacitive coupling. In other words, the first electrode 25 screens partially the second electrode 20 from the detection region 90 thanks to its openings 45.

The disposition, number and shape of the openings 45 are not critical, provide they leave a reasonable degree of coupling. As a rule of thumb, the solid/open area ration of electrode 25 should be close to one, but ample deviations are possible.

The stacked structure 29 has an active shield electrode 23 connected to the shield terminal 34 of the capacitive circuit 80 on a level of the PCB below that of the inner electrode 20 and below the passive screen layer 27. In the drawing, the electrodes 25, 20, 23, 27 are on immediately adjacent layers of the printed circuit board, but this is not a requirement. It is not required that the first electrode 25 be on the topmost layer of the PCB either.

Figures 4, 5:
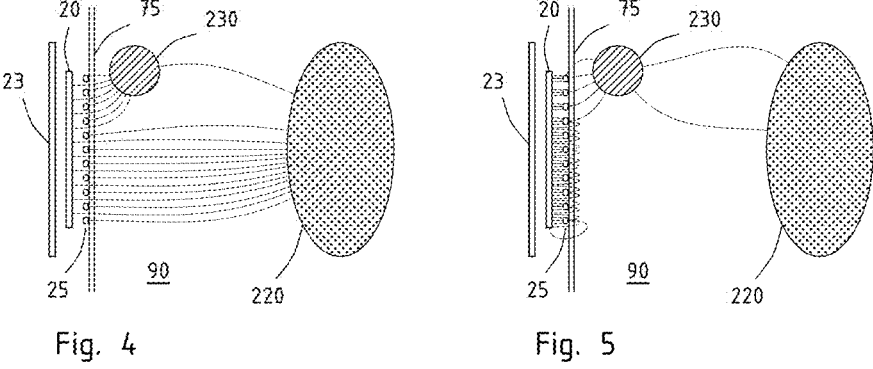
FIG. 4 is an idealized representation of the electrostatic induction between the inventive detector and two bodies in the detection region, at different distances, according to a first measurement mode.
FIG. 5 is another idealized representation of the electrostatic induction between the detector and the same bodies as in FIG. 4, in a second measurement mode.

FIGS. 4 and 5 illustrate, in a simplified fashion, two bodies 220, 230 in the detection region 90 facing electrodes 25 and 20. The electrodes are separated from the detection region 90 by an envelope 75 of the portable device, for example a display panel, which has a negligible or constant effect on the electrostatic coupling and can be disregarded or subtracted. The bodies 220, 230 are at different distances from the electrodes, have different sizes, and their permittivity may differ.

In FIG. 4, the inner electrode 20 is in shield mode and the first electrode is in the measure mode and in this configuration the ADC of the sensor integrated circuit 80 measures a first capacitance C1 of the first electrode 25. In this configuration, the inner electrode 20 can be regarded as equipotential with the first electrode 25.

In FIG. 5, the inner electrode 20 is in ground mode, fixed to a constant potential and in this configuration the ADC of the sensor integrated circuit 80 measures a second capacitance C2 of the first electrode 25. It can be appreciated (even if the figures are only simplified representations) that the electric field in the two configurations is different: while in FIG. 4 the field is comparable to that of a flat electrode, the field in FIG. 5 is more confined in the space between the first electrode and the inner one and does not reach as far away from the electrodes.

The invention derives from the observation that both bodies 230 and 220 contribute to change the value of C1, even though body 230 is much closer to the sense electrode 25. On the other hand, body 220 has much less effect on the value of C2, because the electric field quickly becomes very small when moving away from the sense electrode, in this configuration. Accordingly, it is possible to determine an estimate of the value of the permittivity of an approaching body from the values of C1 and C2.

Figure 6:
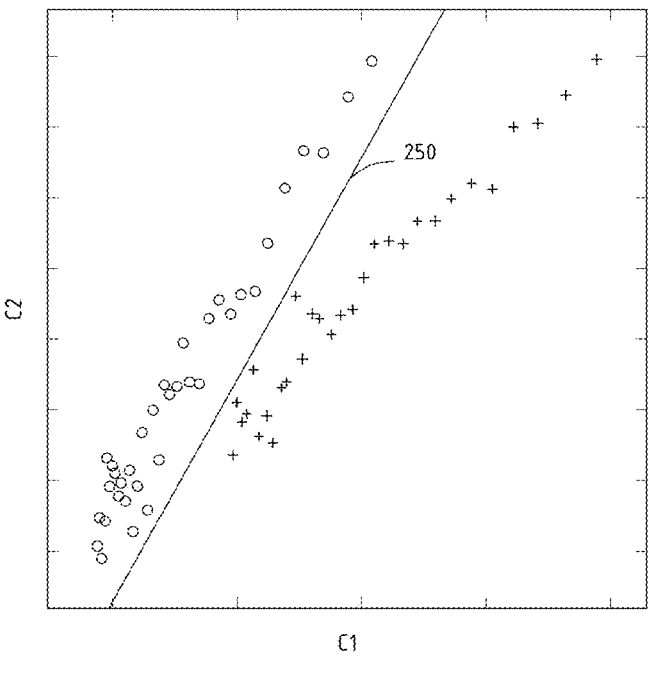
FIG. 6 shows one possible way of determining a dielectric permittivity.

FIG. 6 is a plot showing the values of C1 and C2 for two bodies having a first permittivity (circles) and a second permittivity higher than the first one (crosses) at random distance from the sense electrodes, with an unavoidable superimposed noise. The units on the C1 axis and on the C2 axis are arbitrary and different, as required by the different ranges of variation of C1 and C2. The permittivity cannot be deduced from the value of either C1 or C2 alone, but the two groups can be separated based on the combined knowledge of C1 and C2, provided the difference in Er is not overwhelmed by noise. A dividing line 250 can be found, and it is possible to tell whether a body has the first or the second permittivity by observing on which side of the dividing line the measurements of C1 and C2 lie.

Accordingly, the digital processor 65 of the capacitive sensor is configured or programmed to determine a permittivity based on the values of C1 and C2 measured as above. The graphical method explained in the example is only one of many possibilities to achieve this result.

In embodiments, a value of the relative permittivity is estimated based on a ratio between C1 and C2. In general, the value of the relative permittivity may be deduced from the value of a suitable mathematical function of C1 and C2 that the digital processor 65 can compute. A suitable mathematical function can be predetermined experimentally and empirically with a reasonable effort in tests and simulations. Equivalently, the most probable value of Er for each possible combination of C1 and C2 could be pre-calculated or pre-determined by measurement and stored in a double-entry look up table, which the digital processor can address using the measured values of C1 and C2. The size of the look up table can be managed by quantizing the values of C1 and C2, using transformation of variables, or by other known techniques.

In an extension of the invention, the processor 65 can be programmed to estimate the distance to the approaching body rather than or in addition to the permittivity.

It is observed that, without leaving the invention, the roles of the first electrode 25 and the inner electrode 20 could be exchanged. The capacitive sensor may use a capacitance of the inner electrode measured while the first electrode is held at the shield potential in lieu of C1, and a capacitance of the inner electrode measured while the first electrode is held at a fixed potential in lieu of C2.

Returning to the diagram of FIG. 1, the processor 65 decides by observing the capacitances of the sense electrodes whether a body approaches in the detection region 90 and computes, using C1 and C2 as disclosed, a digital value representing the permittivity of the approaching body. This may be the result of a suitable piece of software running in the processor 65. The integrated circuit 80 may signal the proximity of a body in the detecting region by asserting a digital output 36. This may cause an action in the host system 100. The value of the estimated permittivity, and possibly that of the estimated distance can be linked to predefined registers that the host system can read through the bus 37.

REFERENCE SYMBOLS IN THE FIGURES 20 internal electrode
21 guard ring
23 shield
24 guard ring
25 first electrode
26 printed circuit board
27 ground plane
28 dielectric layers
29 electrodes' stack
31 first capacitance input
32 second capacitance input
34 shield terminal
36 proximity signal
37 digital bus
40 portable device
41 vias
45 openings, apertures
50 offset correction
51 shield control circuit
53 capacitance measuring circuit, capacitance reading unit
54 multiplexer
55 analogue/digital converter
65 digital processor, readout circuit
75 glass
80 capacitive proximity integrated circuit, proximity sensor
90 detection region
100 host system
105 microphone
110 speaker
220 body 230 body
250 dividing line

The invention claimed is:

1. A capacitive proximity sensor for detecting the presence of a conductive or dielectric body in a detection region adjacent to a portable device, the sensor comprising a stacked structure having on a first layer a first electrode facing the detection region and, on a second layer an internal electrode, wherein the first electrode has a plurality of openings that allow a partial capacitive coupling between the internal electrode and conductive and/or dielectric bodies in the detection region, such that the first electrode screens partially the internal electrode, the capacitive proximity sensor comprising one or more than one capacitance reading units configured to determine a capacitance of one electrode and a shield control unit configured to generate a shield potential following that of an electrode whose capacitance is measured by a capacitance reading unit, the capacitive proximity sensor comprising a readout circuit configured to determine a first capacitance of either the first electrode or the internal electrode by applying the shield potential to the other electrode and a second capacitance of either the first electrode or the internal electrode while keeping the other electrode at a fixed potential, and to determine a permittivity of a body in the detection region based on said first capacitance and second capacitance, the capacitive proximity sensor comprising a data transmission interface for the communication with a host system, the data transmission interface being configured to transmit a permittivity value encoding the permittivity of the body in the detection region as a binary variable.

2. The capacitive proximity sensor of claim 1, wherein the readout circuit is configured to determine a distance between the capacitive proximity sensor and the body in the detection region based on said first capacitance and second capacitance.

3. The capacitive proximity sensor of claim 1, wherein the openings are arranged in a regular lattice of holes or stripes.

4. The capacitive proximity sensor of claim 1, wherein the fixed potential is the ground potential.

5. The capacitive proximity sensor of claim 1, the data transmission interface being configured to transmit one or more than one of:

a logic proximity signal indicating that a body is in the detection region, a proximity value encoding a distance between the capacitive proximity sensor and the body in the detection region as a binary variable, the distance being determined from first capacitance and second capacitance.

6. The capacitive proximity sensor of the claim 1, wherein the data transmission interface is a serial bus, for example a I2C bus.

7. The capacitive proximity sensor of claim 1, comprising an interrupt request output that is asserted when a body is detected in the detection region.

8. The capacitive proximity sensor of claim 1, wherein the first electrode and the internal electrode are etched in the conductive layer of a multilayer printed circuit board.

9. The capacitive proximity sensor of claim 8, wherein the first electrode and/or the inner electrode are capacitively coupled to a radio circuit and provide an antenna for the radio circuit.

* * * * *